May 31, 1966 — J. L. ROBERTSON — 3,253,809
ULTRA LOW SPEED AIRCRAFT
Filed Dec. 20, 1963 — 5 Sheets-Sheet 1

INVENTOR.
JAMES L. ROBERTSON
BY
ATTORNEY

May 31, 1966  J. L. ROBERTSON  3,253,809
ULTRA LOW SPEED AIRCRAFT

Filed Dec. 20, 1963  5 Sheets-Sheet 2

INVENTOR.
JAMES L. ROBERTSON
BY
ATTORNEY

FIG. 6
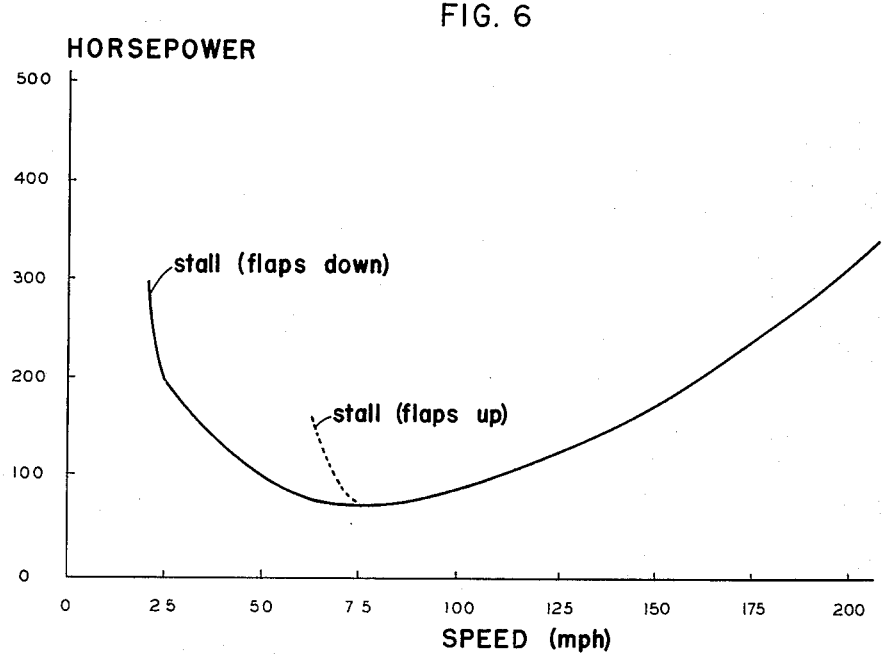
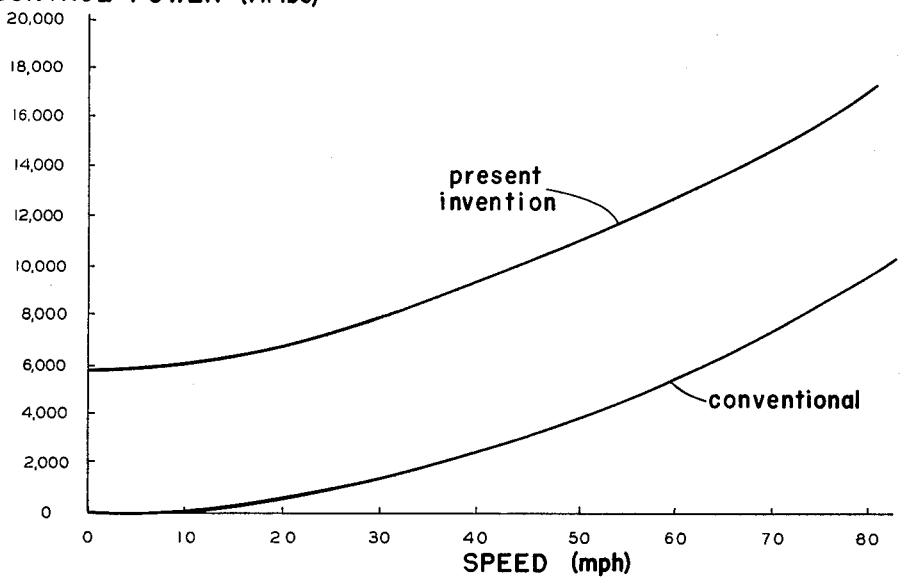
FIG. 7

May 31, 1966  J. L. ROBERTSON  3,253,809
ULTRA LOW SPEED AIRCRAFT
Filed Dec. 20, 1963  5 Sheets-Sheet 5

INVENTOR.
JAMES L. ROBERTSON
BY
ATTORNEY

United States Patent Office 3,253,809
Patented May 31, 1966

3,253,809
ULTRA LOW SPEED AIRCRAFT
James L. Robertson, Fort Worth, Tex., assignor, by mesne assignments, to Wren Aircraft Corporation, Fort Worth, Tex.
Filed Dec. 20, 1963, Ser. No. 332,228
3 Claims. (Cl. 244—89)

This invention relates in general to aircraft control systems and, more particularly, to an ultra low speed aircraft which is adapted to provide control maneuverability at very low air speed.

Aircraft designed for short take-offs and landings or take-offs and landings at ultra low forward speeds are difficult to control. Conventional flight controls depend on air speed for effectiveness and are virtually useless at a forward speed of 40 m.p.h. or less. Consequently, many costly and complex devices, such as tail rotors, tail fans, tail tilt jets, and even tail engines, have been used in an attempt to provide controllability at ultra low forward speeds. However, these methods have only been used to a limited extent since their complexity seriously detracts from their operational usefulness.

It is, therefore, the primary object of the present invention to provide an ultra low speed aircraft that is relatively simple and economical.

It is also an object of the present invention to provide an ultra low speed aircraft which can take off, land, and maneuver in very short spaces and at ultra low forward speeds without impairment of maneuverability.

It is another object of the present invention to provide a control system which will allow aircraft to climb out of and glide into small areas at angles in excess of 30°.

It is still another object of the present invention to provide a control means which will counteract engine torque and slipstream induced yaw at very low or even zero air speeds.

With the above and other objects in view, my invention resides in the novel features of form, construction, arrangement, and combination of parts presently described and pointed out in the claims.

In the accompanying drawings—

FIG. 6 is a graph showing the relation between horsepower required for level flight and forward speed of a representative type of aircraft constructed in accordance with and embodying the present invention;

FIG. 7 is a graph showing the relation between control power and forward speed of a representative type of aircraft constructed in accordance with and embodying the present invention;

Figure 1:
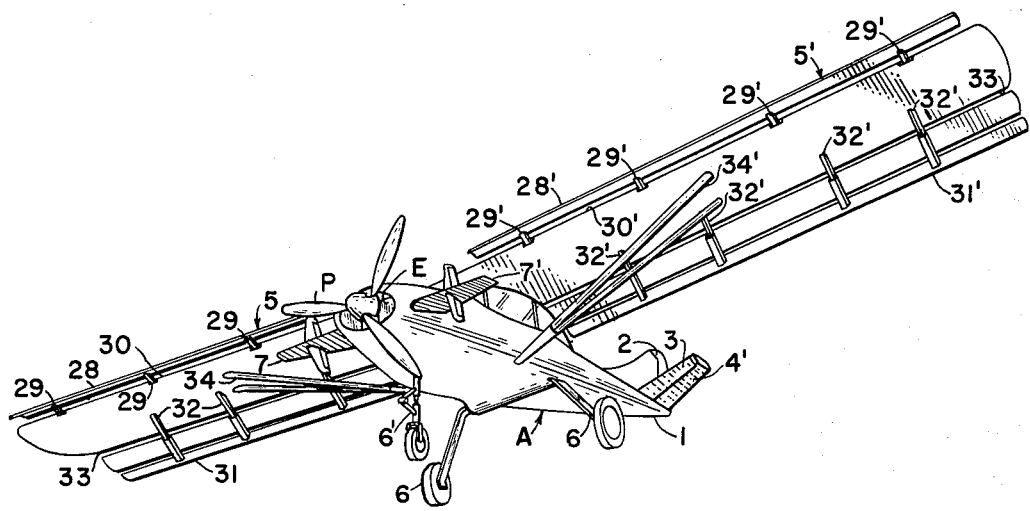
FIG. 1 is a perspective view of an aircraft constructed in accordance with and embodying the present invention.

Referring now in more detail and by reference characters to the drawings, which illustrate a preferred embodiment of the present invention, A designates an aircraft comprising a fuselage 1, a rudder 2, a stabilizer 3, tail-elevators 4, 4', right and left wings 5, 5', wheels 6, 6', and a propeller P. The forward portion of the fuselage 1 is provided with right and left ultra low speed nose controls 7, 7', which are mounted slightly aft of the propeller P so as to receive the full force of the propeller slipstream.

The ultra low speed nose controls 7, 7', include two essentially horizontally extending airfoils 8, 8', which have leading edges 9, 9', that extend outwardly and rearwardly from the fuselage 1 at a small sweep angle. The members 8, 8', have abruptly ending trailing edges 10, 10', to which are hinged nose-elevators 11, 11', having sharp trailing edges 12, 12'. These nose-elevators 11, 11', are essentially rectangular in shape and may be either electrically, hydraulically or manually operated by the pilot, so that the trailing edges 12, 12', may assume positions either above or below the essentially horizontal plane in which the airfoils 8, 8', lie. Preferably, the operation of the nose-elevators 11, 11', should be integrated with the operation of the tail-elevators 4, 4'. Rigidly secured to the outer ends of the airfoils 8, 8', are aerodynamically shaped tips 13, 13', which extend rearwardly from the leading edges 9, 9', to the trailing edges 12, 12'. The tips 13, 13', are provided for reducing the drag which is inherent in the abruptly shaped outer ends of the members 8, 8'.

Extending upwardly, approximately midway between the fuselage 1 and tips 13, 13', respectively, are two upper nose-fins 14, 14', which have leading edges 15, 15', that extend upwardly and rearwardly to form a small sweep angle. The upper nose-fins 14, 14', have abruptly ending trailing edges 16, 16', to which are hinged upper nose-rudders 17, 17', having sharp trailing edges 18, 18'. These nose-rudders 17, 17', are essentially rectangular in shape with the exception of the lower rear portions which have chamfers 19, 19', to provide space for upward movement of the nose-elevators 11, 11'. Rigidly secured to the upper ends of the nose-fins 14, 14', are aerodynamically shaped upper tips 20, 20', which extend rearwardly from the leading edges 15, 15', to the trailing edges 18, 18', and thereby reduce the drag that is inherent in blunt edges.

Extending downwardly from approximately the center of the airfoils 8, 8', and located directly below the nose-fins 14, 14', are two lower nose-fins 21, 21', which have leading edges 22, 22', that extend downwardly and rearwardly, thereby forming a small sweep angle. The nose-fins 21, 21', have abruptly ending trailing edges 23, 23', to which are hinged two lower nose-rudders 24, 24', having sharp trailing edges 25, 25'. The lower nose-rudders 24, 24', are essentially rectangular in shape, with the exception of the upper rear portions which have chamfers 26, 26', to provide space for movement of the nose-elevators 11, 11'. The upper and lower nose-rudders 17, 17', 24, 24', move together and the operation thereof is integrated with the operation of the tail-rudder 2. The nose-rudders 17, 17', 24, 24', and tail-rudder 2 are either electrically, hydraulically or mechanically operated by the pilot, so that the trailing edges 25, 25', may assume various angular positions, either inboard or outboard of the vertical plane of the nose-fins 21, 21', respectively. Rigidly secured to the lower ends of the nose-fins 21, 21', are aerodynamic shaped lower tips 27, 27', which extend rearwardly from the leading edges 22, 22', and provide a reduction in the drag that would otherwise be experienced by the blunt edges.

In addition to the nose controls 7, 7', the aircraft A is preferably, though not necessarily, provided with right and left shrouds 28, 28', which are secured to forwardly extendable rods 29 that project through leading edges 30, 30', on the wings 5, 5'. The rods 29 are electrically or otherwise suitably controlled and can be extended in a forward direction by the pilot when he desires to increase the lift of the aircraft A. At higher speeds, the shrouds 28, 28', are normally retracted, so that they lie flush against the leading edges 30, 30', and thus reduce the drag.

The aircraft A is also provided with right and left high-lift flaps 31, 31', which are secured to extendable rods 32 that project rearwardly through the trailing edges 33, 33', of the wings 5, 5'. The flaps 31, 31', can be extended in a rearward direction by the pilot when he desires to increase the lift of the aircraft A. At higher speeds, he will normally retract the flaps 31, 31', also to reduce the drag of the aircraft A. It should be noted that the shrouds 28, 28', and the flaps 31, 31', are ordinarily extended together at low speeds to provide aerodynamic balance to the wings 5, 5', and retracted together at higher speeds. Preferably, said wings 5, 5', are provided with V-shaped struts 34, 34' respectively as shown in FIG. 1.

The aircraft A is provided with an engine or power plant E which has a thrust-weight ratio at or in excess of .30 which produces a high velocity propeller slipstream.

In ultra low speed aircraft, it has often been proposed to utilize large flaps such as slotted flaps or Fowler flaps which will, when lowered, produce very high lift and high drag, thereby permitting the aircraft to maintain level flight at relatively low forward speed. Of course, the high drag which operates to reduce forward speed requires a sharp increase in power to maintain level flight. At the same time, the very low forward speed at moment of touch-down makes it possible to bring the aircraft to a stop in a relatively short amount of landing-roll. Although this is entirely correct as a matter of aerodynamic theory, in practice this type of aircraft, with conventional control-surfaces, is very difficult to maneuver. This is exemplified by the horsepower-speed curve in FIG. 6. An engine propeller system capable of doing this will produce substantially increased torque which tends to cause the fuselage to roll, and this is compensated for in aerodynamic design by utilizing large aileron deflections which, therefore, reduce the amount of roll control power available for maneuvering. Furthermore, when operating at high levels of power and low air speeds, the slipstream tends to cork screw back around the fuselage as it travels rearwardly, thereby producing a side force on the vertical tail with an attendant yawing moment which must be compensated for by large rudder deflections, thereby reducing the amount of yaw control available for maneuvering.

Another control problem encountered in conventional aircraft at low air speeds is the rapid decay of control power as forward speed drops off. The reason for this is that, in conventional aircraft, the effectiveness of control surfaces depends upon the square of the aircraft's forward speed. Thus, as forward speed is reduced in half, control power is reduced by three-fourths square it should also be noted in aircraft embodying the present invention that a substantial amount of control becomes available precisely when it is most needed, namely, at the low speeds and altitudes associated with short take-off and landing operations. This is illustrated in FIG. 7 which shows the control power in terms of foot pounds of control moment around the center of gravity of the aircraft as a function of forward speed. In FIG. 7, the lower curve is representative of the control power obtained in conventional short landing and take-off aircraft, whereas the upper curve is representative of the control power obtained with an aircraft constructed in accordance with the present invention. As this curve shows, conventional control power drops off sharply with speed leaving very little maneuvering control power available when it is most needed.

Figure 8:
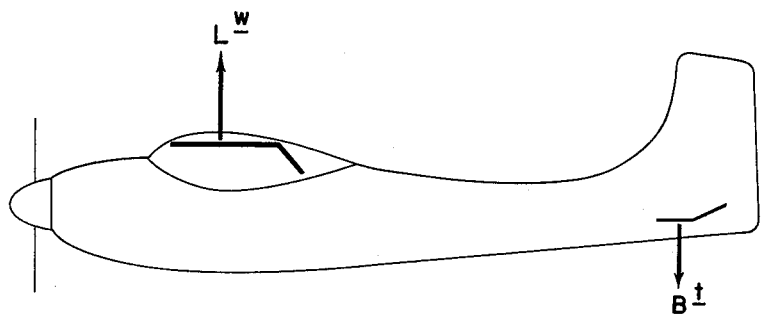
FIG. 8 is a schematic drawing of a conventional ultra low speed aircraft showing the relationship between various aerodynamic forces applicable thereto in level flight.
Figure 9:
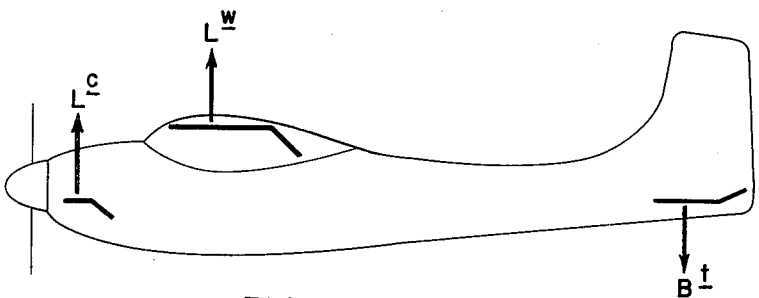
FIG. 9 is a schematic drawing of an aircraft constructed in accordance with and embodying the present invention showing the various aerodynamic forces applicable thereto in level flight.

As shown in FIGS. 8 and 9, the present invention increases the useful load of an airplane. As the large flaps are deflected, a nose-down pitching moment is imposed on the aircraft which must be compensated for by a tail-down load to maintain trim. This balancing tail-down load substracts as shown in FIG. 8 from the total lift as follows:

Assume, $$L^w = 3000\#,$$
$$B^t = 300\#$$
$$\text{Net lift} = L^w - B^t = 3000\# - 300\# = 2700\#$$

The present invention, however, trims out this high-flap pitching moment by producing an up-load on the nose control surfaces, thus adding to the net lift as shown in FIG. 9 as follows:

Assume, $$L^w = 3000\#,$$
$$B^t = 100\#,$$
$$C^1 = 660\#$$
$$\text{Net lift} = L^w + C^1 - B^t = 3000\# + 650\# - 100\# = 3560\#$$

Thus, the net lift of the aircraft is increased approximately 32%. Since the tare weight of the aircraft is normally about 2100#, the pay load is increased from 600# to 1460# or an increase of approximately 140%.

It should also be noted that one of the unique features of the present invention is that, below a selected speed of minimum power (i.e. VMP), it becomes progressively more effective as airspeeds decrease, since the nose control effectiveness depends on slipstream velocity which, in turn, depends on power and, as can be seen from FIG. 6, below a speed of about 75 m.p.h., the slower the aircraft flies, the more power is required to maintain level flight and the more effective the nose controls become. In this connection, it should be noted that the curves of FIGS. 6 and 7 are correct for a particular aircraft constructed for experimental purposes and can vary for aircraft of different aerodynamic characteristics.

Figure 5:
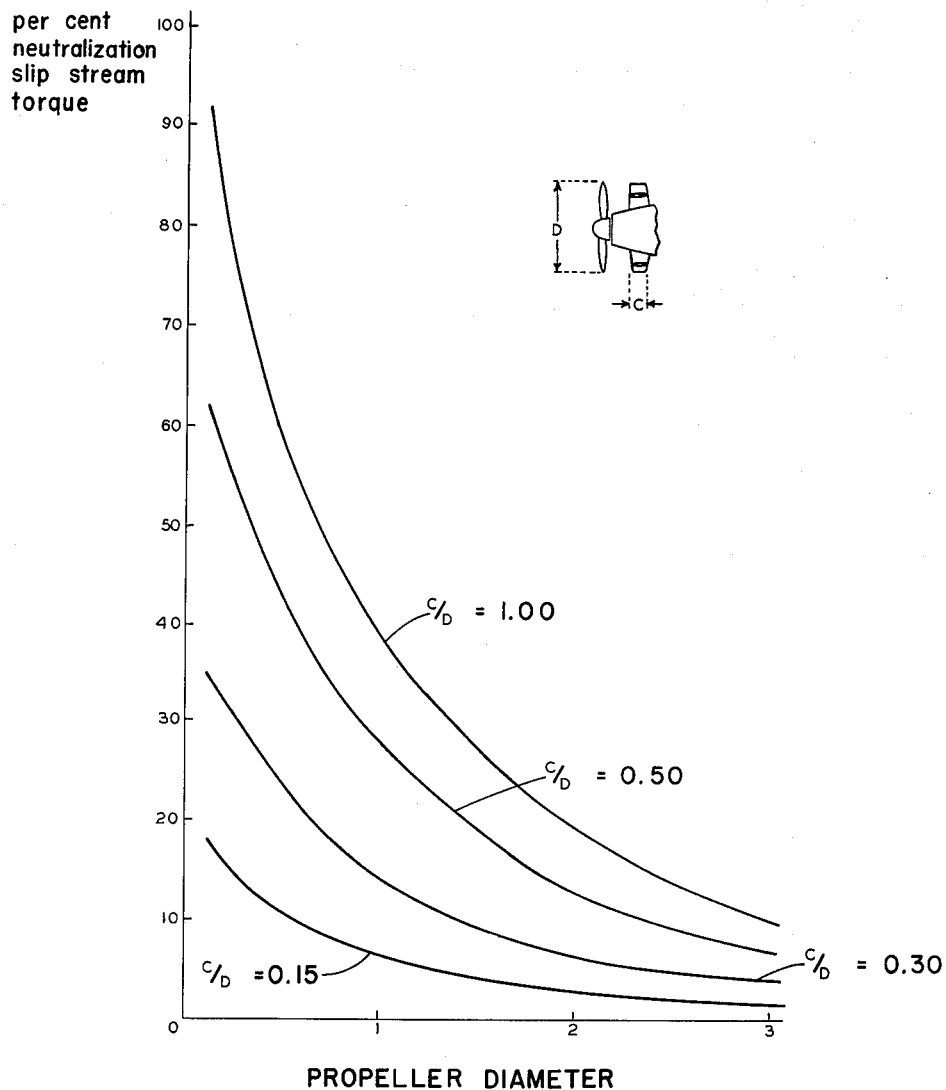
FIG. 5 is a graph showing the relation of one aspect of control effectiveness with respect to propeller-diameter for various sizes of nose control surfaces.

It will also be apparent that the nose-elevators 11, 11', may be operated in unison for pitch-control and differentially for roll-control. Similarly, the nose-rubders 17, 17', and 24, 24', can be operated in unison for yaw control. It has also been determined in connection with the present invention that the leading edges 9, 9', of the nose controls 7, 7', should be located as close to the rear margins of the propellers P as may be mechanically safe and expedient. Theoretically, if it were mechanically possible to achieve a distance of only a few thousandths of an inch, it would be possible to approach maximum control efficiency. However, where this spacing is a matter of a few inches, the loss in control efficiency is not particularly great. On the other hand, where this distance is greater than 1.5 prop diameters, the control efficiency drops off to a point at which it becomes of marginal value. In this connection, there are two other parameters which must be taken into account. The nose controls 7, 7', must preferably be as far forward of the center of gravity of the aircraft as possible. If the nose controls 7, 7', were located substantially at the center of gravity of the aircraft, their effect would again become marginal, inasmuch as there would be no moment arm around which their aerodynamic force could operate. Finally, it has been found in connection with the present invention that the lengthwise chord of the nose controls 7, 7', has a definite relationship to the prop diameter. In other words, the ratio $c/D$, as designated in FIG. 5, should not be lower than .15. FIG. 5 illustrates the effect of this ratio in terms of the percentage of efficiency which the nose controls 7, 7', achieve toward the reduction of torque-induced roll. The nose controls 7, 7', also straighten the corkscrew effect of the propeller slipstream substantially compensating for the yaw-producing moment thereof.

Figure 2:
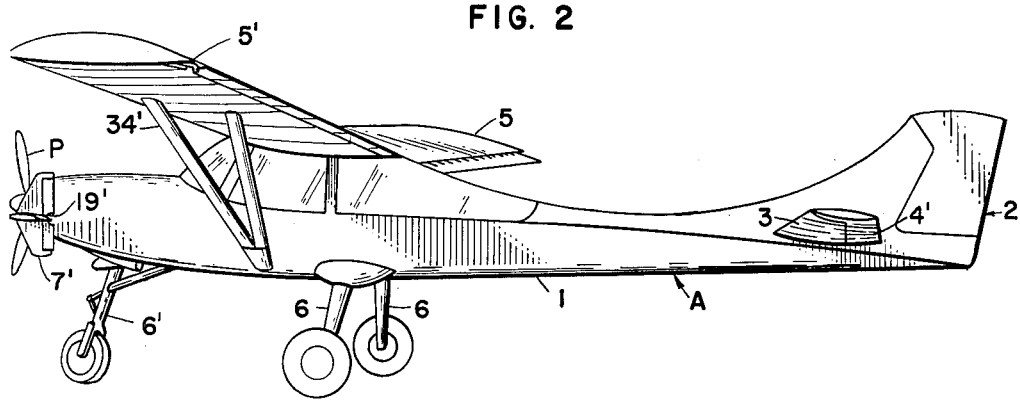
FIG. 2 is another perspective view of the aircraft which has an ultra low speed aircraft control system constructed in accordance with and embodying the present invention.
Figure 3:
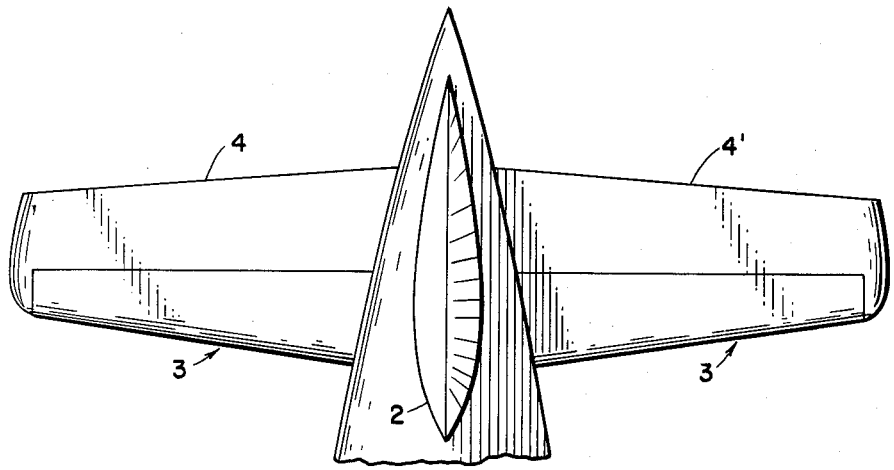
FIG. 3 is a fragmentary top plan view of the aircraft particularly illustrating the propeller, the nose controls, and the tail empennage.
Figure 3:
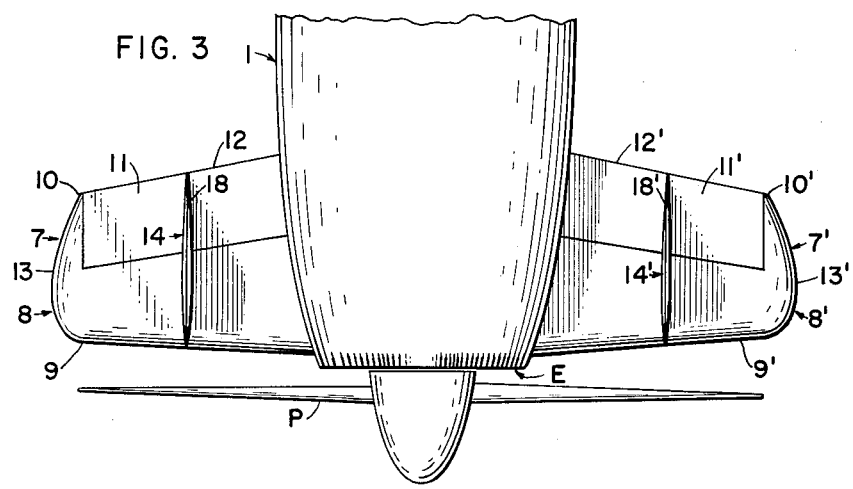
Figure 4:
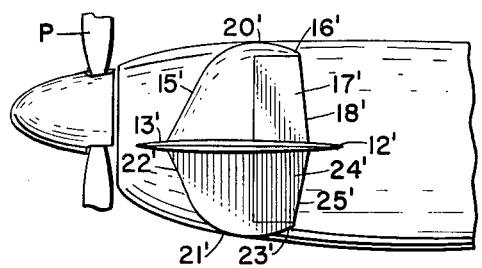
FIG. 4 is a side elevational view of the forward portion of the fuselage, the propeller, and the ultra low speed nose controls.

It should be noted that the nose controls 7, 7', as shown in FIGS. 1-3, are only one of many control surface types that may be used. Tests have indicated that virtually any type of aerodynamic airfoil-surface can be used as ultra low speed controls. It can thus be seen that controls which are mounted slightly aft of the propeller P so as to receive the essentially undiminished propeller slipstream will make possible the use of very large amounts of engine power without developing adverse conditions resulting from engine torque.

It should be understood that changes and modifications in the form, construction, arrangement, and combination of the several parts of the ultra low speed aircraft may be made and substituted for those herein shown and described without departing from the nature and principle of my invention.

Having thus described my invention, what I claim and desire to secure by Letters Patent is:

1. In an aircraft having a fuselage mounting a propeller and aerodynamic lift inducing elements respectively on opposite sides of a center of gravity and wherein said lift inducing elements include drag producing control means operative above a predetermined stall speed to increase the aerodynamic lift capability of the lift inducing elements, means for extending the effectiveness of the control means below said predetermined stall speed and increase the lift capability of the aircraft including, airfoil means disposed effectively within the slip stream of said propeller for aerodynamically inducing lift below said predetermined stall speed, means mounting the airfoil means on the fuselage between the propeller and the center of gravity for reducing the turning moment produced by said lift inducing elements about the center of gravity, and adjustable control surface means mounted by the airfoil means within the slip stream of the propeller for maintaining lift and maneuverability of the aircraft below said predetermined stall speed, said airfoil means extending laterally from the fuselage and having a chordal length greater than 0.15D, where D is the diameter of the propeller.

2. The combination of claim 1 wherein said control surface means includes nose fins mounted by the airfoil means in laterally spaced relation to the fuselage within the slip stream of the propeller.

3. In an aircraft having a fuselage mounting a propeller and aerodynamic lift inducing elements respectively on opposite sides of a center of gravity and wherein said lift inducing elements include drag producing control means operative above a predetermined stall speed to increase the aerodynamic lift capability of the lift inducing elements, means for extending the effectiveness of the control means below said predetermined stall speed and increase the lift capability of the aircraft including, airfoil means disposed effectively within the slip stream of said propeller for aerodynamically inducing lift below said predetermined stall speed, means mounting the airfoil means on the fuselage between the propeller and the center of gravity for reducing the turning moment produced by said lift inducing elements about the center of gravity, and adjustable control surface means mounted by the airfoil means within the slip stream of the propeller for maintaining lift and maneuverability of the aircraft below said predetermined stall speed, said control surface means including nose fins mounted by the airfoil means in laterally spaced relation to the fuselage within the slip stream of the propeller.

References Cited by the Examiner

UNITED STATES PATENTS

| | | | |
|---|---|---|---|
| 1,358,603 | 11/1920 | Zahn | 244—87 X |
| 1,720,960 | 7/1929 | Lilley. | |
| 1,862,902 | 6/1932 | McDonnell | 244—42 |
| 1,890,059 | 12/1932 | Lake | 244—45 |
| 2,609,165 | 9/1952 | Hill | 244—42 |

MILTON BUCHLER, *Primary Examiner.*

ANDREW H. FARRELL, *Examiner.*